Dec. 10, 1957 E. S. DAVIS 2,815,850
CONVEYOR BELTING
Filed Dec. 16, 1954
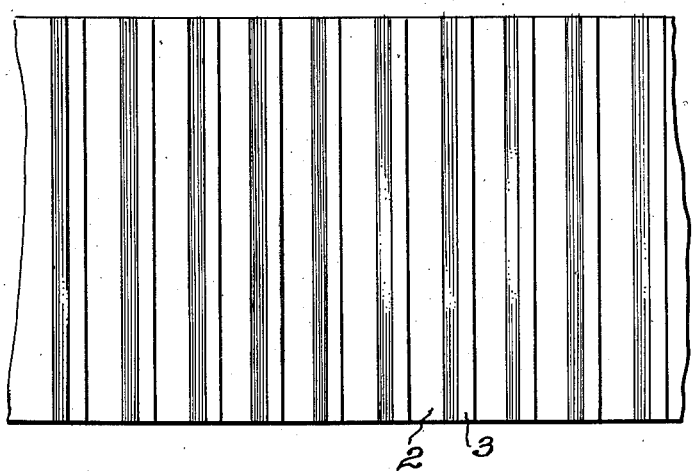
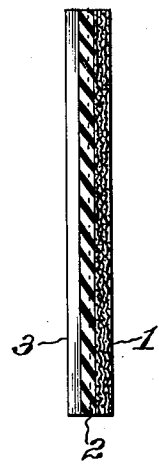
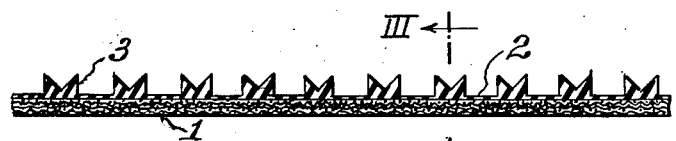
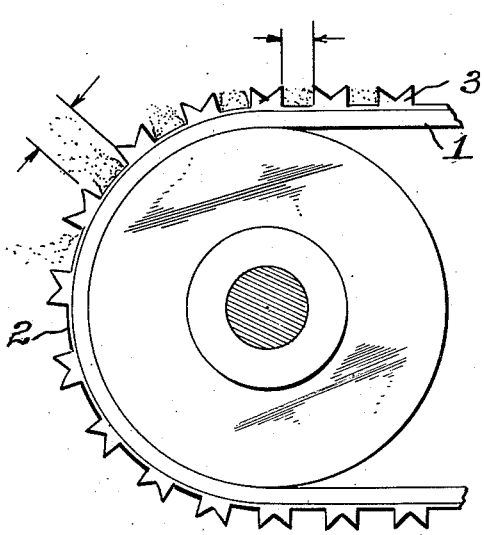
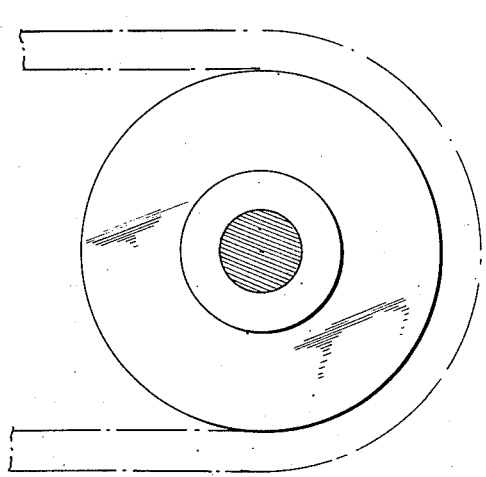
INVENTOR
Edwin S. Davis
BY
ATTORNEYS 2,815,850
Patented Dec. 10, 1957

2,815,850

CONVEYOR BELTING

Edwin S. Davis, Hopewell Junction, N. Y., assignor to New York Rubber Corporation, New York, N. Y., a corporation of New York Application December 16, 1954, Serial No. 475,717

3 Claims. (Cl. 198—199)

My invention relates to an improvement in conveyor belting and, more particularly, to endless belting which is normally caused to travel around wheels or pullies during its operative cycle.

An object of the invention is to provide such belting in which the form and spacing of cleats enables the belting to be used at an exceptional angle of inclination without slippage of articles thereon being forwarded upwardly by the belt in either direction of movement.

Another object is to provide such belting which has high capacity for self cleaning or elimination of foreign particles that may collect between the cleats, the elimination being accomplished by the flaring of the cleats and enlargement of the spaces therebetween as the belt passes around its wheels or head pullies.

A further object is to provide such belting in which the base is of less flexibility and elasticity than the cleated supporting surface thereof to promote the self cleaning flaring of the cleats as they round the wheels or pullies.

A still further object is to provide such belting which durably retains its co-efficient of friction, and which well lends itself to equipment with article centering means.

Broadly, my invention comprises conveyor belting in which a strain resisting flexible base supports cleats of unique form and arrangement whereby the efficiency of the same as a forwarding medium is increased and more than usual cleanliness thereof is ensured during operation.

A practical embodiment of my invention is shown in the accompanying drawing in which:

Fig. 1 represents a top plan view of a section of belting constructed according to the invention;

Fig. 2 represents a side elevation of the form of my invention disclosed in Fig. 1;

Fig. 3 represents a transverse vertical section taken on the line III—III of Fig. 2, looking the direction of the arrows; and Fig. 4 represents in side elevation, the form shown in the previous figures in operative condition, the effect of the belt passing over an end pulley being exaggerated for emphasis.

Referring to the drawing, in which similar parts are similarly numbered, the flexible strain resisting base 1 is shown as consisting of several layers or plies of rubber impregnated fabric, while the carrying surface 2 is composed of rubber. Spaced across the latter throughout the belting length are cleats 3 which have substantially vertical side walls that terminate in inwardly and downwardly angled surfaces, as clearly shown in Figs. 2 and 4, so that the tops of the cleats take the form of V-grooves with sharp edges.

The spacing of the cleats is slight, e. g. approximately equal to the width of the cleats, to provide both large supporting area and abundant frictional gripping of articles transported by the belting.

In operation, the sharp edges of the V-grooves in the tops of the cleats engage a surface of articles to be forwarded by the belting and, due to their positive engagement, multiplicity and novel proportions, permit the use of the belt at a greater angle to the horizontal without slippage of the articles thereon. Practical tests have shown that articles having cardboard, wood, and steel casings and of varying dimensions and weights, can be forwarded by this belting upwardly at an inclination of forty-seven to fifty-three degrees without slippage.

Another valuable feature of this invention resides in the fact that the flexing of the belt as it passes over its wheels or pulleys facilitates the discharge therefrom of particles or other foreign matter lodged between the cleats. This is automatic action and leads to longer life and efficiency. The flaring of the sides of the cleats and the slight increase in their spacing is illustrated in exaggerated form in Fig. 4 and pointed out by the radial lines and arrows; as is likewise the discharge or spilling out of the particles entrapped between the cleats. This function is promoted or facilitated by the comparatively high flexibility or elasticity of the rubber supporting or carrying surface and the cleats as contrasted with the resistance of the fabric base.

In the drawing the cleats are shown in slight relative enlargement to make clearer their form and functioning. In practice, I have determined a satisfactory specification to be three plies of twenty eight ounce duck, rubber impregnated and/or frictioned, for the base; and a one eighth inch thickness or height for the rubber cleated supporting or carrying surface, with the cleats slightly wider than high, as represented. These sizes and proportions may, of course, be suitably altered to meet in an appropriate and satisfactory manner the requirements of differing conditions, purposes and installations.

It will be understood that the belting may be fabricated and produced by rubberizing the duck fabric, plying, molding the rubber supporting surface with its cleats, and vulcanizing, all as is well understood in this industry and calls for no detailed explanation.

Since it is evident that various changes may be made in the construction, form, material and arrangement of the several elements without departing from the spirit and scope of my invention, I do not intend to be limited to the specific embodiment herein shown and described except as set forth in the appended claims.

What I claim is:

1. Self cleaning conveyor belting designed and adapted for conveying articles at a substantial angle of inclination without slippage of the articles thereon when the belting is driven in either longitudinal direction comprising, a fabric base and a molded rubber article supporting surface joined together in a unitary structure, the supporting surface being formed with transversely extending elongated cleats each provided with a longitudinal groove in its top terminating in upwardly extending sharp flexible side edges having their outer sides substantially normal to the base surface between the cleats and their inner sides at an acute angle thereto, the spacing between adjacent cleats being less than twice the width of individual cleats to provide a large supporting surface and frictional gripping area for each article carried constituted by the plurality of closely disposed sharp edges to prevent slipping of the articles when the belt is driven at an angle of inclination.

2. Conveyor belting as defined in claim 1, in which the relative elasticity of the base and the supporting surface together with the spacing of the cleats is such that the passing of the belting around its pulley with the base in contact therewith will cause the cleats to spread and flare apart slightly thus discharging foreign particles collected between the cleats.

3. Conveyor belting as defined in claim 1, in which the width of each cleat is at least as great as its height.

(References on following page)

References Cited in the file of this patent

UNITED STATES PATENTS

| | | | |
|---|---|---|---|
| 2,211,648 | Currie | Aug. 13, | 1940 |
| 2,286,055 | Brittell | June 9, | 1942 |
| 2,400,667 | Toews | May 21, | 1946 |

FOREIGN PATENTS

| | | | |
|---|---|---|---|
| 6,806 | Great Britain | May 12, | 1900 |
| 449,390 | Germany | Sept. 13, | 1927 |
| 1,094,880 | France | Dec. 15, | 1954 |